2,829,120

OXALIC ACID AND TRIPHENYL PHOSPHITE-CONTAINING POLYESTER-ETHYLENIC MONOMER RESINS TO INHIBIT CORROSION OF METALS

Earl E. Parker, Milwaukee, Wis., assignor to Pittsburgh Plate Glass Company, Allegheny County, Pa., a corporation of Pennsylvania No Drawing. Application June 17, 1954
Serial No. 437,585

3 Claims. (Cl. 260—45.4)

This invention relates to polymerizable or interpolymerizable materials and the polymers and interpolymers thereof, said materials comprising polyesters of polyhydric alcohols and carboxylic acids containing alpha-beta ethylenic groups, or comprising mixtures of these polyesters and soluble interpolymerizable monomers containing $>C=CH_2$ groups preferably attached to negative radicals. The invention has particular relation to the reduction of the corrosiveness of such materials with respect to certain metals, notably copper and its alloys.

It has heretofore been suggested to prepare polyesters which are polymerizable by addition reaction and which comprise the products of esterification of a polyhydric alcohol, notably a glycol, and an alpha-beta ethylenic dicarboxylic acid such as maleic acid or fumaric acid. These polyesters can be subjected to polymerization by heating, preferably in the presence of a free radical initiator type catalyst such as benzoyl peroxide, in order to effect cross-linking through addition reaction of the reactive ethylenic groups in the polyester chains. Even more importantly, it has been suggested to mix the foregoing polyesters with vinylic, or vinylidene, or acrylic, or allylic monomers, or similar monomers containing terminal $>C=CH_2$ groups which as previously stated, are usually attached to a negative radical. The resultant polyesters or mixtures thereof with monomers are usually liquid materials which can be poured into molds and caused to undergo addition reactions by the application of heat. The resultant reactions are usually quite fast and can be effected at moderate temperatures and without the application of any substantial pressure. Such polyesters and interpolymerizable mixtures thereof with monomers have enjoyed a rapid and increasing use. In certain fields, however, they have not proven to be entirely satisfactory. For example, it has been found that when they are in contact with certain corrodible metals, e. g. tin, and notably copper, or copper containing materials such as bronze or brass, they exert an objectionable corroding action which action seemingly is accelerated or promoted by free radical initiators such as benzoyl peroxide and similar materials conventionally employed to promote the rate of the addition reaction.

This invention comprises the discovery that certain materials such as oxalic acid and triaryl phosphites constitute valuable additives or modifiers for the foregoing polyesters and mixtures of the polyesters with monomers containing $>C=CH_2$ groups. Especially, the invention involves the discovery that mixtures of oxalic acid and triaryl phosphites such as triphenyl phosphite are even more effective modifiers of the polyesters of the interpolymerizable mixtures thereof with monomers than are either of the compounds taken singly. Polyesters of the previously described type, or mixtures thereof with monomers containing $>C=CH_2$ groups, when appropriately modified with small amounts of oxalic acid or triaryl phosphites or preferably a mixture of the two, have improved resistance to premature gelation. Moreover, they exhibit a greatly reduced tendency to corrode copper or copper containing materials with which they may come into contact. This characteristic is especially valuable in those instances in which the polyesters or mixtures of polyesters and monomers further contain free radical initiator type catlysts such as benzoyl peroxide, which as previously stated, have been found greatly to increase the tendency of the polyesters or mixtures to corrode copper or its alloys.

The electrical field constitutes one important branch of the art in which the principles of the present invention may be applied with success. In this field it is often desirable to coat, or to embed copper or copper containing materials such as wires and contacts with or in the interpolymerizable mixtures containing peroxides as catalysts and then to bake them at an elevated temperature in order to effect resinification of the interpolymerizable mixtures through addition reaction. Under such conditions, there is a strong tendency to corrode the copper thus causing discoloration of the resin and perhaps even more importantly, adversely affecting the electrical properties of the resin and perhaps impairing the physical properties of the metal itself.

It has further been proposed to prepare polyesters comprising dicarboxylic acids such as maleic acid and a mixture of glycols such as propylene glycol or diethylene glycol and a polyethylene glycol. The resultant polyesters are emulsifiable in water to form oil-in-water emulsions in which the polyethylene glycol acts as a chemically combined emulsifier. The interpolymerizable mixtures of these polyesters and monomers such as styrene, or diallyl phthalate, are also emulsifiable to provide oil-in-water dispersions. The emulsions of these materials in water have been used as agents for coating or impregnating preforms and mats of such fibrous materials as glass fibers or the like.

Polyesters have also been formed by cooking alpha-beta ethylenic dicarboxylic acids with mixtures of lower dihydric alcohols, such as propylene glycol, diethylene glycol and the like, and polyethylene glycol. The resultant polyesters when mixed with an appropriate monomer containing a $>C=CH_2$ group have also been used to impregnate and seal the pores in castings of copper containing materials such as bronze or brass. In such use, the casting is placed under vacuum and is then immersed in the liquid mixture under pressure to drive it into the pores. Excess polymerizable material is washed away with water to leave the pores filled with polymerizable material. The casting is then baked to cross-link the polyester molecules, thus providing a hard, insoluble, thermoset resin filling for the pores. Where the casting contains copper, a problem of corrosion is presented.

In mixtures employed in either of these fields, small corrosion inhibiting amounts of oxalic acids or a triaryl phosphite, or preferably a mixture of the two, may be incorporated in order practically to eliminate the tendency of the mixtures to corrode copper or copper containing metals.

Polyesters of dihydric alcohols and alpha-beta ethylenically unsaturated dicarboxylic acids which singly or in mixture with monomers can be used to coat, invest or impregnate copper containing materials, may be prepared in accordance with well recognized techniques such as are disclosed in numerous patent and literature references. Examples of patent references containing disclosures of the preparation of the appropriate polyester and mixtures thereof with ethylenic monomers comprise: 2,593,787, 2,409,633, 2,443,735, 2,443,741, 2,450,552 and many others. The preparation of such polyesters is also disclosed in the article in "Industrial and Engineering Chemistry," December 1939, page 1512, and again in the same publication for January 1940, page 64.

The present invention contemplates the use of any of the polyesters and mixtures of polyesters with ethylenic monomers as media for coating, impregnating, or otherwise contacting copper or its alloys and compounds. In any of these, oxalic acid or triaryl phosphites, or preferably mixtures of the two, may be employed as protective agents to prevent action between the metal and the contacting medium.

In the preparation of the polyesters, various polyhydric alcohols may be employed; however, particular emphasis is placed on such dihydric alcohols as ethylene glycol, diethylene glycol, propylene glycol, trimethylene glycol, alpha- or beta-butylene glycol, and others containing about 2 to 6 carbon atoms. It is often desirable to include substantial amounts, e. g. about 5 to 25 percent by weight based on the polyester, of polyethylene glycols, such as those of molecular weights between about 300 to 4000, e. g. 300 to 1600 and being represented by the so-called Carbowax 1540 or 1540 W. A substantial amount of polyethylene glycol is especially desirable in those instances where it is contemplated to prepare polyesters which are water emulsifiable. In such polyesters, a polyethylene glycol component properly cooked with the other components of the polyester, constitutes a cooked-in or combined emulsifying agent which is exceptionally advantageous. The use of polyethylene glycols in the preparation of polyesters and subsequently the incorporation of such polyesters with monomers such as styrene and the preparation of valuable emulsions of the resultant interpolymerizable mixtures is elaborated upon in a copending application Serial No. 318,870, filed November 5, 1952, by John R. Guenther. The techniques of this copending application may be employed in the preparation of emulsifiable materials in accordance with the provisions of the present invention.

The dibasic acid components of the polyesters employed in the practice of the present invention include any of the conventionally recognized dibasic acids, at least a part of which contain alpha-beta ethylenic groups. Such alpha-beta ethylenically unsaturated dicarboxylic acids include maleic acid, itaconic acid, fumaric acid, aconitic acid, mesaconic acid, citraconic acid, methyl maleic acid, and numerous others.

While the alpha-beta ethylenically unsaturated dicarboxylic acids may be employed without modifying acids, it is often desirable and indeed it is usually preferable to employ such acids in admixture with dicarboxylic acids which are free of ethylenic unsaturation. Such acids include aryl dicarboxylic acids of the type of phthalic acid, terephthalic acid and isophthalic acid, or methyl, chloro, or other derivatives of such acids where the added groups are non-functioning. Non-ethylenic dicarboxylic acids which may be mixed with the alpha-beta ethylenic acids previously discussed also include aliphatic dicarboxylic acids such as succinic acid, adipic acid azelaic acid, sebacic acid, and others containing, for example, up to 10 carbon atoms or more.

While reference has been made to the dicarboxylic acids, this term has been used in a broad sense to include either the free dicarboxylic acids or the anhydrides thereof, which react to form the same polyesters as the free acids and which are often preferable to the acids per se. This applies to both the alpha-beta ethylenic dicarboxylic acids and also to the non-ethylenic dicarboxylic acids.

It will be appreciated that in some instances, it may be desirable to include in the polyesters, small amounts of fatty acids, preferably unsaturated such as drying oil acids and being represented by linoleic acid, linolenic acid, clupanodonic acid, elaeostearic acid and others. Obviously, mixtures of the monocarboxylic acids, for example such as may be obtained by hydrolysis of drying or semi-drying oils, may be employed. Such mixtures usually will include some saturated acid components, as well as some components such as oleic acid which are not sufficiently unsaturated to impart drying properties to the esters.

In preparing the polyesters it will be recognized that the polyhydric alcohol components are usually employed in amounts at least stoichimetrically equivalent to the total of the acid components and in many instances, it is preferable to employ a slight excess, e. g. in 2 to 10 or 15 percent excess of the alcohol component. The esterification customarily is conducted at a temperature around 300° F. or 400° F., or at such temperature as will cause esterification reaction with resultant evolution of water. Removal of water may be promoted by inclusion of a medium such as xylene designed to distill azeotropically with the water. Usually the reaction is conducted under such conditions as to exclude air from the reaction zone. Esterification is continued until desired viscosity is attained and until the acid value has been reduced to a value below 100 and preferably to a value below about 50 to 60 or less, for example 20 to 45. Sometimes the acid value is carried down to 5 or 10. In no instance is the reaction of esterification carried so far as to produce an insoluble, infusible ester product.

The proportion of non-ethylenic dicarboxylic acid may extend from none at all up to the maximum amount. However, if it is employed, it is suggested that the proportion thereof be within a range of about 0.25 to 10 moles per mole of the alpha-beta ethylenic dicarboxylic acid. Very good products are obtained when the dicarboxylic acids are approximately equimolar with respect to each other. If fatty acids are included in the acid mixture, the proportion thereof will usually be relatively small, e. g. 1 or 2 moles to about 10 or 12 moles of the dicarboxylic acid or mixture of dicarboxylic acids.

Monomers which may be employed with the polyesters to increase the fluidity of the initial reaction mixture and also for purposes of cross-linking the polyester molecules during the curing operation, include the various so-called monomers containing terminal $>C=CH_2$ groups attached to a negative radical. Such monomers usually are liquids and soluble in, or compatible with the polyesters and are susceptible of interpolymerization with the polyesters by addition reactions. Appropriate monomers comprise hydrocarbons containing the terminal ethylenic group and being represented by:

Styrene
Alpha methyl styrene
Para methyl styrene
Divinyl benzene
Vinyl toluene, and others
Esters containing terminal ethylenic groups and being represented by:
    Vinyl acetate
    Methyl methacrylate
    Methyl acrylate
    Allyl acrylate
    Allyl acetate
    Diallyl phthalate
    Diallyl succinate
    Diallyl adipate
    Diallyl sebacate
    Diethylene glycol bis(allyl carbonate)
    Triallyl phosphate
Nitriles such as: Acrylonitrile Any of these ethylenically unsaturated monomers may be combined with any of the polyesters herein disclosed. It is further contemplated to employ mixtures of the monomers. The monomers will usually be employed in an amount in a range of about 10 to 60 percent by weight based on the interpolymerizable mixture. Conversely, the polyester comprises about 40 to 90 percent by weight of the interpolymerizable mixture.

It will be recognized that interpolymerizable mixtures of polyesters containing alpha-beta ethylenic unsaturation and monomers containing terminal ethylenic groups undergo interpolymerization to form gels at a rapid rate even in the absence of catalysts and this is especially true in those cases where it is desirable to heat the polyester and the monomer in order to promote solution of the two and thus to form a homogeneous mixture. In order to prevent premature gelation, it is usually essential that one or both components of the mixture include an inhibitor of gelation or premature polymerization.

It will be recognized that oxalic acid as well as triaryl phosphites constitute gelation inhibitors of some value when they are taken singly or in combination. This is especially true in those instances where the mixture further contains a catalyst of polymerization. Accordingly, these components may be added to the polyester or to the monomer component before the two are mixed and advantage may thus be taken of the inhibitory capacity inherent in oxalic acid and the triaryl phosphite. However, it is also contemplated to include in the interpolymerizable mixtures conventional gelation inhibitors such as the catechols, quinone, hydroquinone, quaternary ammonium salts such as trimethylbenzyl ammonium chloride, elaborated upon in the previously mentioned Patent 2,593.787. Appropriate gelation inhibitors comprise quinone, hydroquinone, 4-tertiary-butyl catechol, 3-isopropyl catechol, 4-normal-butyl catechol and others. These may be employed in a range of about 0.001 to 5 percent based on the polyester component.

Oxalic acid when employed without added triaryl phosphite, as a corrosion inhibitor and/or as a gelation inhibitor, may be added in an amount of about 0.01 to 3 percent by weight based on the interpolymerizable mixture. The triaryl phosphite when used in combination with oxalic acid, is employed in an amount within this range. Usually the amount is at least equal to the amount of oxalic acid and often the amount will be in excess of that of the oxalic acid. A good ratio of oxalic acid to triaryl phosphite is about 1 part of the former to 2 parts of the latter. A very satisfactory mixture comprises 0.25 percent by weight based upon the mixture of oxalic acid to 0.50 percent upon a like basis of the latter. The oxalic acid may be added to the polyesters at a temperature of about 140° C. The triphenyl phosphite may be added at about 120° C.

The aryl groups of the triaryl phosphite may be phenyl, tolyl, xylyl or monochloro substituted derivatives thereof; that is, any aryl group containing a single benzene nucleus. Triphenyl phosphite is preferred.

In order that products of greatest hardness, strength and other desirable properties may be attained, it is preferable to include in the interpolymerizable mixtures small amounts of catalytic agents notably of the so-called free radical initiator type, and being represented by the various peroxides or hydroperoxides, such as benzoyl peroxide, tertiary butyl hydroperoxide, cyclohexyl hydroperoxide, acetyl peroxide, lauroyl peroxide. These catalysts tend strongly to increase the corrosive action of the mixtures with respect to copper.

Still other catalysts comprise azo and diazo types represented by alpha, alpha' azodiisobutyronitrile. Appropriate diazo type catalysts are described in U. S. Patents 2,376.014 and 2,488,690. The several types of catalytic agents will usually be employed in an amount of about 0.1 to 5 percent, based upon the interpolymerizable mixtures.

Interpolymerizable mixtures of polyesters containing alpha-beta ethylenic unsaturation and monomers containing terminal ethylenic groups and also including oxalic acid or a triaryl phosphite or preferably a mixture of oxalic acid and a triaryl phosphite, when properly catalyzed with a free radical initiator, may be employed as a liquid casting medium, for example in the potting of coils of copper wire such as are characteristic in electrical apparatus or the like. The interpolymerizable mixtures may then be cured to the hard, chemically resistant state in which they are of high electrical resistance and of high dielectric value merely by heating at a moderate temperature and with or without application of pressure as may be desired.

In those instances where the interpolymerizable mixtures containing oxalic acid and/or a triaryl phosphite are to be employed as solutions, for example in coating or impregnating castings or similar articles, of copper, bronze, or brass, or other alloys of copper, the polyester containing an emulsifying agent, preferably a polyethylene glycol cooked in as a polyhydroxy component of the polyester, is mixed with a monomer such as styrene. A free radical type catalyst such as benzoyl peroxide or similar peroxide agent acting as a catalyst may be added shortly before the mixture is to be used. The liquid interpolymerizable mixture is applied to the article to be treated as described, by a dipping operation, preferably under pressure. If desired the dipping operation may be preceded by application of vacuum in order to exhaust the pores and thus to promote filling of the latter by the liquid. Subsequently, the article is washed with water to remove excess material from the surface. The article is then heated to effect a cure of the interpolymerizable mixture to the desired state of hardness and infusibility.

Specific applications of the use of the invention are illustrated by the following examples:

*Example I*

The polyester component in this example was of the non-emulsifiable type and comprised:

| | Moles |
|---|---|
| Maleic anhydride | 1 |
| Adipic anhydride | 6 |
| Diethylene glycol | 7.18 |

These were reacted with evolution of water to form a fusible, soluble polyester. The temperature of the polyester was brought to 140° C. and oxalic acid was stirred in. The resin was then cooled to about 120° C. and an equal weight of styrene, together with 0.025 percent based upon the total mixture of hydroquinone was added. The samples were cooled as quickly as possible.

A series of samples in which the oxalic acid content was varied from 0.02 to 2 percent by weight (based upon the total polymerizable mixture) was so prepared. The samples containing oxalic acid, even when of such low concentration as 0.02 percent, possessed good "tank life." This latter property is the capacity of the resin to withstand gelation upon standing after the incorporation of a free radical initiator type catalyst. This property was determined by cooling the mixture to room temperature and adding 1.5 percent by weight, based upon the total weight of the resinifiable mixture, of benzoyl peroxide. The catalyzed samples where then allowed to stand at a temperature of 100° F. until gelation occurred. Samples containing 0.02 percent by weight of oxalic acid possessed a "tank life" of 27 to 33 hours.

The samples also possessed a very good rate of cure which was determined by so-called LPE tests, conducted by introducing the polymerizable mixture to be tested into test tubes of 16 millimeters' diameter to a depth of about 3 inches. A thermocouple was then inserted into the mixture to a depth of about 1 inch above the bottom of the tube, and the tube was heated in a water bath at 212° F. During the heating operation, the temperature rose exothermically and the interval in minutes between the time when temperature reached 150° F. until the maximum temperature was attained was taken as the LPE value. This is a criterion of the rate of cure of the mixture. Those mixtures which cure in a short time are preferred and the shortness of the LPE time interval is an indication that the oxalic acid has but slight effect upon the ultimate cure.

In a specific LPE determination of the material herein disclosed, a maximum exothermal temperature of 293°

F. was attained in a water bath at a temperature of 212° F. and the time interval was 5.4 minutes.

For purposes of determining the effect of oxalic acid as an inhibitor of corrosion of the mixture upon copper, an 18 gauge copper wire was thoroughly cleaned with fine sand paper and was wound about a glass rod into a spiral. The spiral was further soaked in acetone for a few minutes and allowed to dry in air. It was then inserted in a clean test tube and enough of the resin mixture, containing benzoyl peroxide and oxalic acid in the amounts described, was poured into the tube completely to cover the wire coil to a depth of about ½ inch. In order to cure the mixture, the tube was heated at 160° F. until the resinifiable mixture was gelled. It was then heated for 48 hours at 250° F. in order to assure complete and thorough cure and to subject the wire to a severe corrosion test. In all instances where the samples contained from 0.02 to 2.0 percent by weight of oxalic acid, there was no observable corrosion. This constitutes good evidence that oxalic acid per se is an effective inhibitor of corrosion of copper and its alloys by an interpolymerizable mixture of the polyester, monomer and a peroxide type catalyst of polymerization. The interpolymerizable mixture could be employed for embedding electrical conductors of various types containing copper.

*Example II*

In this example, a polyester was prepared by esterification reaction between; 1 mole of maleic acid and 1 mole of phthalic acid and 2.2 moles of propylene glycol, to which mixture was added 21 percent by weight of so-called Carbowax 1540 which is a polyethylene glycol understood to have a molecular weight of about 1300–1600. The resulting mixture was heated at about 385° F. in the absence of air and with evolution of water. The latter was removed as it was formed. The resultant polyester was then mixed while hot and fluid with styrene containing hydroquinone and oxalic acid. The interpolymerizable mixture was of the following proportions:

| | Parts by weight |
|---|---|
| Styrene | 29 |
| Polyester | 71 |
| Hydroquinone | 0.077 |

The proportion of oxalic acid in the compositions was varied to provide a series of samples containing from 0.02 percent by weight based upon the mixture to 0.05 percent by weight upon a like basis of oxalic acid. Free radical initiator was not used.

The effect of the mixtures upon copper was determined by adding 1 percent by weight upon the mixture of finely powdered copper to samples of the material in test tubes. The samples were then incubated at a temperature of 150° F. This is a severe test of the corrosion inhibitor. A period of 24 to 48 hours was required for corrosion to become appreciable. This is a more severe test than that described in Example I.

Liquid interpolymerizable mixtures could be employed to impregnate castings containing corrodible metal and excesses of the composition could be washed off with water and the resin could be hardened by baking.

*Example III*

The procedure of Example II was repeated but with triphenyl phosphite in place of oxalic acid. The triphenyl phosphite was varied over a range of from 0.2 percent by weight to 0.8 percent by weight (based upon the total resinifiable mixture). Samples were tested as in the former Example II.

The results of the tests are tabulated as follows:

| | Gel time, days |
|---|---|
| 0.2 percent triphenyl phosphite | 3 |
| 0.4 percent triphenyl phospite | 15 |
| 0.6 percent triphenyl phosphite | 15 |
| 0.8 percent triphenyl phosphite | 15 |

It will be observed that the mixtures containing triphenyl phosphite were relatively resistant to gelation. None of the samples became discolored. The triphenyl phosphite is relatively effective as a corrosion inhibitor and is per se of value in such capacity.

*Example IV*

In this example, triphenyl phosphite and oxalic acid were employed in combination as copper corrosion inhibitors. The polyester contained 21 percent by weight based upon the polyester components of polyethylene glycol of an average molecular weight of about 1300 to 1600 and was the same polyester as was employed in Example II. The polyester was mixed with styrene and with hydroquinone as in said Example II and then was treated with a mixture of oxalic acid and triphenyl phosphite in order to render it noncorrosive with respect to copper. The interpolymerizable mixture was of the following composition:

| | |
|---|---|
| Polyester | 71 parts by weight. |
| Styrene | 29 parts by weight. |
| Hydroquinone | 0.007 part by weight. |
| Triphenyl phosphite | 0.5 percent by weight based upon the total mixture. |
| Oxalic acid | 0.25 percent by weight based upon the total mixture. |

The foregoing mixture was catalyzed with 1 percent by weight based upon the resinifiable mixture of benzoyl peroxide. Control samples (hereinafter indicated as 1), of the catalyzed mixture were tested for LPE. Tests were made for this value initially and at subsequent intervals. A second set of samples (indicated as 2), was then prepared and 1 percent by weight of finely powdered copper was added.

A third set of samples (indicated as 3), of similar composition was prepared and 1 percent, based upon the weight of the mixture, of granular tin was added.

Still a fourth set of samples (indicated as 4), was prepared containing 1 percent by weight of finely powdered copper and 1 percent by weight of tin whereby to simulate the composition of bronze. The several sets of samples were tested at intervals to determine the rate of cure as indicated by LPE value and those of sets 2, 3 and 4 observed for green discoloration indicating the corrosive action of the materials on the metallic powders. The results of these several tests are tabulated as follows:

| Time in Days | LPE in Minutes | | | |
|---|---|---|---|---|
| | 1 (no metal) | 2 with Cu | 3 (tin) | 4 tin and Cu |
| 0 | 4.3 | 4.5 | 4.3 | 4.5 |
| 1 | 9.0 | 8.75 | 9.0 | 8.75 |
| 3 | 10.8 | 10.12 | 10.8 | 10.12 |
| 7 | 11.2 | 9.4 | 11.2 | 9.5 |
| 14 | 9.5 | 9.25 | 9.65 | 9.25 |
| Physical Properties | Not gelled | Not gelled | Not gelled | Not gelled |
| Discoloration | None | None | None | None |

It will be observed that the mixture of triphenyl phosphite and oxalic acid is a very effective inhibitor of corrosion. Owing to the presence of catalyst, this is a severe test. The mixture of the two is more effective than either component taken by itself. The mixture of inhibitors is also a stabilizer against premature gelation of the interpolymerizable mixture even at temperatures of 100° F. and there about. It will be observed that copper and tin, in metallic form, do not substantially affect the rate of cure of materials containing triphenyl phosphite and oxalic acid.

The interpolymerizable mixtures of Example IV containing free radical initiator and corrosion inhibitor, may readily be emulsified in water. Where these emulsifiable materials are employed for impregnating porous castings. A liquid interpolymerizable mixture of the resinifiable materials is made up and the castings are immersed therein. If desired the immersion may be effected under hydrostatic pressure for purposes of increasing the permeation of the porous structure. Excess materials may readily be removed by washing the castings with water in order to emulsify the resinifiable material, and thus to remove it. Subsequently, the castings can be baked at appropriate temperatures, e. g. 75 to 250 or 300° C. or thereabouts, in order to convert the resinifiable materials in the pores of the castings into hard, infusible, thermoset state. Corrosion of the metal by the material is inhibited or greatly retarded by the inhibitor system.

It will be appreciated that the percentage of polyethylene glycol in the polyester component disclosed in Examples II, III and IV is susceptible of considerable variation. Proportions, for example in a range of about 5 to 25 or 30 percent by weight based upon the total composition of the polyester, may be employed. The preparation of a polyester which is emulsifiable and contains a reduced amount of polyethylene glycol is illustrated by the following examples:

Example V

A polyester suitable for emulsification was prepared by the reaction of 1 mole of maleic anhydride with 1.1 moles of diethylene glycol, and 5 percent by weight (based upon the total amount of polyester) of a polyethylene glycol known as Carbowax 1540 W (molecular weight about 1300 to 1600). The reaction mixture was heated to esterification temperature for a period of time sufficient to evolve water and to reduce the acid number below 50.

The modified polyester thus obtained, while sufficiently hot to attain a liquid state, was stabilized with 0.02 percent by weight, based upon the polyester, of tertiary butyl catechol and a monomer, namely diallyl phthalate, in an amount to provide a mixture comprising 70 parts by weight of polyester, and 30 parts by weight of the diallyl phthalate, was added. A catalyst of polymerization, namely 4 percent by weight of a commercial product known as Luperco ATC and which comprised a mixture of equal parts by weight of benzoyl peroxide and tricresyl phosphate, was added. The mixture was emulsifiable to form oil-in-water emulsions without added emulsifiers.

A liquid mixture of the resinifiable material may be applied to castings in the manner previously described, and the excess of material may be washed away with water. Subsequently, the casting can be heated in order to cure the resinifiable components remaining in the pores thereof.

Example VI

In this example, the base resin employed in preparing the emulsifiable bonding material comprised the same components as the corresponding element in Example II. However, 10 percent by weight based upon the reactive components of Carbowax 1540 W of a molecular weight of about 1300 to 1600, was employed to attain water dispersibility from the reaction mixture. The polyester in an amount of 70 parts by weight was incorporated while hot with 30 parts by weight of diallyl phthalate. This monomer, of course, could be replaced by styrene if so desired or by any other of the monomers or equivalent monomers herein disclosed. The mixture was catalyzed with 4 percent by weight of Luperco ATC of the composition above described.

This emulsifiable material may be employed as a liquid mixture for impregnating castings containing copper. After the resinifiable material has been applied, excess material may be washed away with water.

It will be understood that the embodiments and examples of the invention as herein disclosed are by way of illustration. It will be recognized that numerous modifications may be made therein without departure from the spirit of the invention or the scope of the appended claims.

I claim:

1. A liquid, interpolymerizable mixture which is substantially non-corrosive to copper when contacted therewith and comprising (A) 40 to 90 percent by weight of a polyester of (I) a mixture of aliphatic dihydric alcohols, one being a polyethylene glycol of a molar weight between about 300 and 4,000 said polyethylene glycol constituting from about 5 to about 25 percent by weight based upon the polyester, the rest of the dihydric alcohol component being aliphatic glycol containing from 2 to about 6 carbon atoms; (II) a dicarboxylic acid component in such an amount that the dihydric alcohol component is in excess thereof in an amount of 2 to 15 percent upon the basis of chemical equivalency of the dicarboxylic acid component, the latter being a mixture of an alpha-beta ethylenic dicarboxylic acid in a ratio of about 1 mole and 0.25 to 10 moles of a dicarboxylic acid of a class consisting of an aliphatic dicarboxylic acid containing up to 10 carbon atoms and an aromatic dicarboxylic acid of a class consisting of phthalic acid, terephthalic acid and isophthalic acid (C) about 0.01 to 3 percent by weight based upon the interpolymerizable mixture of triphenyl phosphite (D) 0.01 to 3 percent by weight upon a like basis of oxalic acid (E) the rest of the mixture being essentially a $>C=CH_2$ monomer.

2. A body comprising copper disposed in contact with a liquid, interpolymerizable mixture which is substantially non-corrosive to the copper and which comprises (A) a polyester of (I) a dihydric alcohol component which is a mixture of dihydric alcohols, one being polyethylene glycol of a molar weight of between about 300 and about 4,000, said polyethylene glycol constituting from about 5 to about 25 percent by weight based upon the polyester, the rest of the dihydric alcohol component being an aliphatic glycol containing from 2 to about 6 carbon atoms, (II) a dicarboxylic acid component comprising about 1 mole of alpha-beta ethylenic dicarboxylic acid and from 0.25 to 10 moles of a dicarboxylic acid of a class consisting of an aliphatic dicarboxylic acid containing up to 10 carbon atoms and an aromatic dicarboxylic acid of a class consisting of phthalic acid, terephthalic acid and isophthalic acid, the dicarboxylic acids being used in an amount such that the dihydric alcohol is in about 2 to 15 percent by weight in excess of equivalency (C) about 0.01 to 3 percent by weight based upon the interpolymerizable mixture of triphenyl phosphite (D) 0.01 to 3 percent by weight upon a like basis of oxalic acid and (E) a $>C=CH_2$ monomer constituting the rest of the mixture.

3. An interpolymerizable mixture which is substantially non-corrosive to copper when contacted therewith and comprising (A) 40 to 90 percent by weight of a polyester of (I) an aliphatic glycol containing from about 2 to about 6 carbon atoms and (II) a dicarboxylic acid component in an amount such that the dihydric alcohol is in excess thereof in an amount of about 2 to 15 percent upon the basis of chemical equivalency of the dicarboxylic acid component, the latter being a mixture of an alpha-beta ethylenic dicarboxylic acid in a ratio of about 1 mole and 0.25 to 10 moles of a dicarboxylic acid of a class consisting of an aliphatic dicarboxylic acid containing up to 10 carbon atoms and an aromatic dicarboxylic acid of a class consisting of phthalic acid, terephthalic acid and isophthalic acid (C) about 0.01 to 3 percent by weight based upon the interpolymerizable mixture of triphenyl phosphite (D) 0.01 to 3 percent by weight upon a like basis of oxalic acid (E) the rest of the mixture being essentially a $>C=CH_2$ monomer.

References Cited in the file of this patent

UNITED STATES PATENTS

| | | |
|---|---|---|
| 2,407,479 | D'Alelio | Sept. 10, 1946 |
| 2,437,232 | Rothrock et al. | Mar. 2, 1948 |
| 2,664,413 | Parker | Dec. 29, 1953 |